(12) United States Patent
Ito

(10) Patent No.: US 9,094,558 B2
(45) Date of Patent: Jul. 28, 2015

(54) IMAGE FORMING APPARATUS, METHOD FOR CONTROLLING THEREOF, AND STORAGE MEDIUM

(71) Applicant: CANON KABUSHIKI KAISHA, Tokyo (JP)

(72) Inventor: Nobuyasu Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/244,191

(22) Filed: Apr. 3, 2014

(65) Prior Publication Data

US 2014/0300917 A1 Oct. 9, 2014

(30) Foreign Application Priority Data

Apr. 4, 2013 (JP) .................................. 2013-078434

(51) Int. Cl.
*G06F 15/00* (2006.01)
*H04N 1/00* (2006.01)
*G03G 15/00* (2006.01)

(52) U.S. Cl.
CPC ....... *H04N 1/00885* (2013.01); *G03G 15/5004* (2013.01)

(58) Field of Classification Search
CPC .............................. G06F 3/1229; G06F 3/1221
USPC .......................................................... 358/1.14
See application file for complete search history.

(56) References Cited

U.S. PATENT DOCUMENTS

2002/0054330 A1* 5/2002 Jinbo et al. ................... 358/1.15

FOREIGN PATENT DOCUMENTS

JP 2012118253 A 6/2012
JP 2012248961 A 12/2012

* cited by examiner

*Primary Examiner* — Saeid Ebrahimi Dehkord
(74) *Attorney, Agent, or Firm* — Canon U.S.A., Inc. IP Division

(57) ABSTRACT

An image forming apparatus includes a detection unit configured to detect an object, a reception unit configured to receive an operation of a user, and a shifting unit configured to shift, if the detection unit detects an object, a power state of the image forming apparatus from a first power state to a second power state different from the first power state, and shift, if the reception unit receives an operation of a user, the power state of the image forming apparatus from the second power state to the first power state.

11 Claims, 13 Drawing Sheets

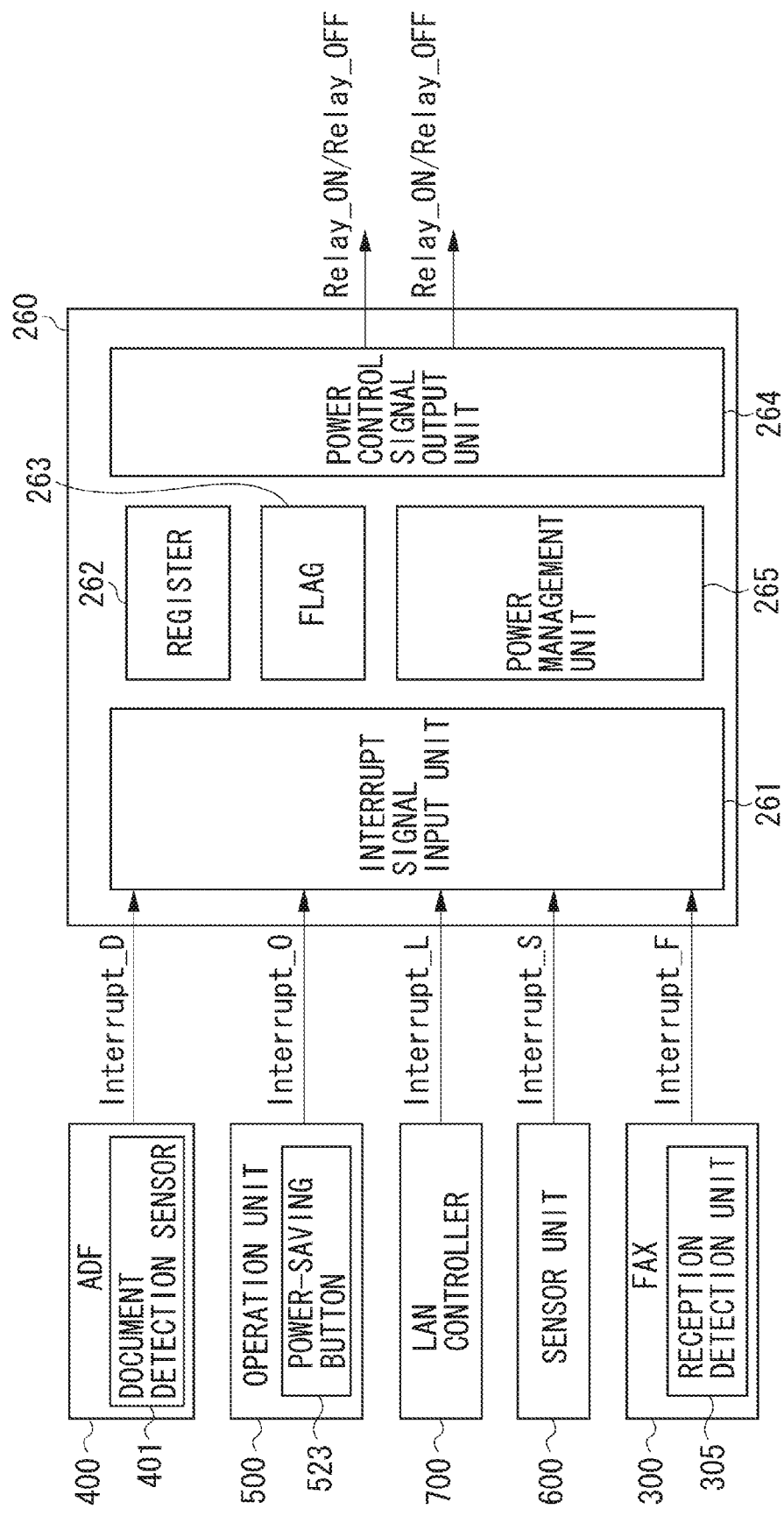

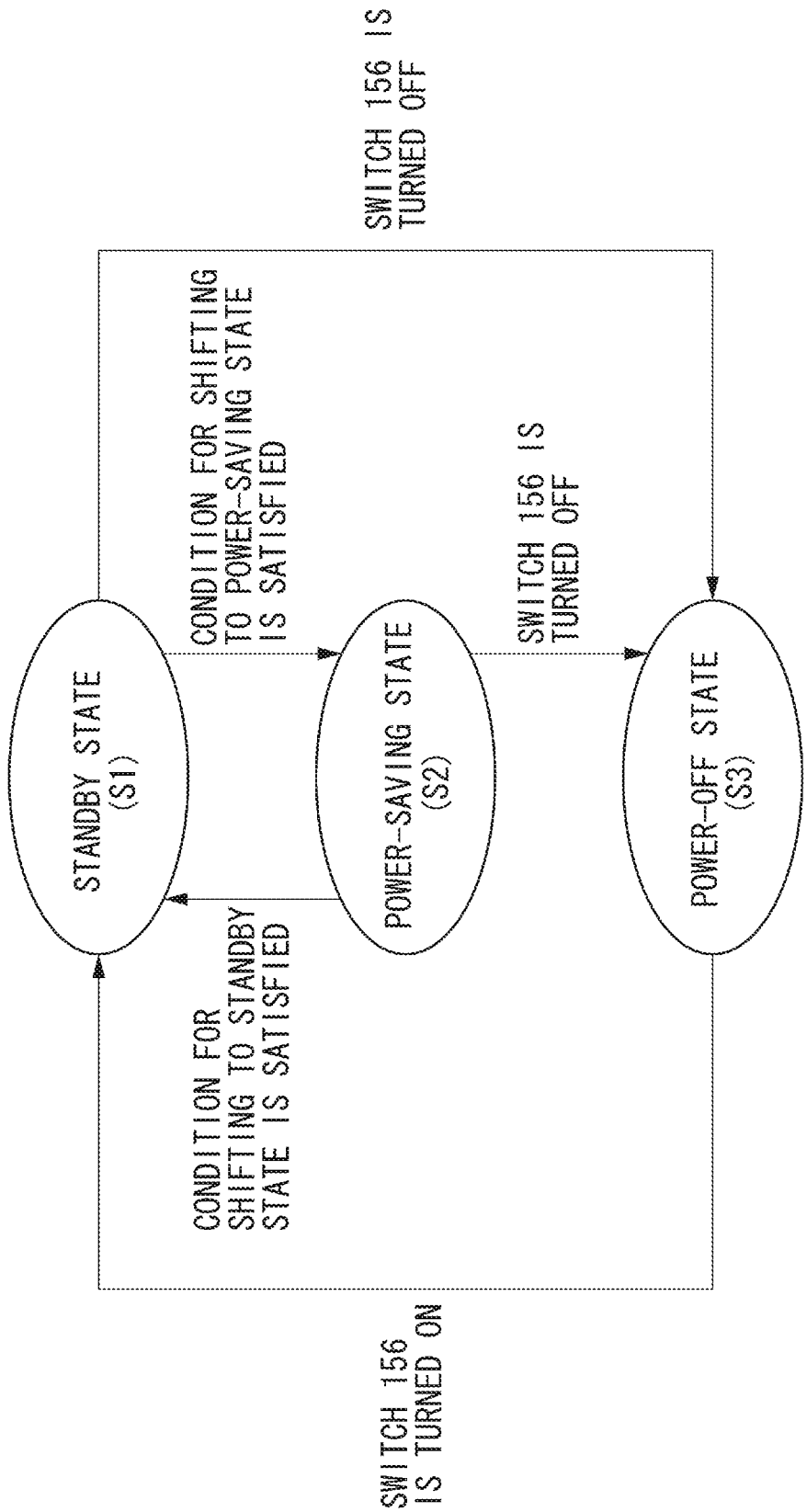

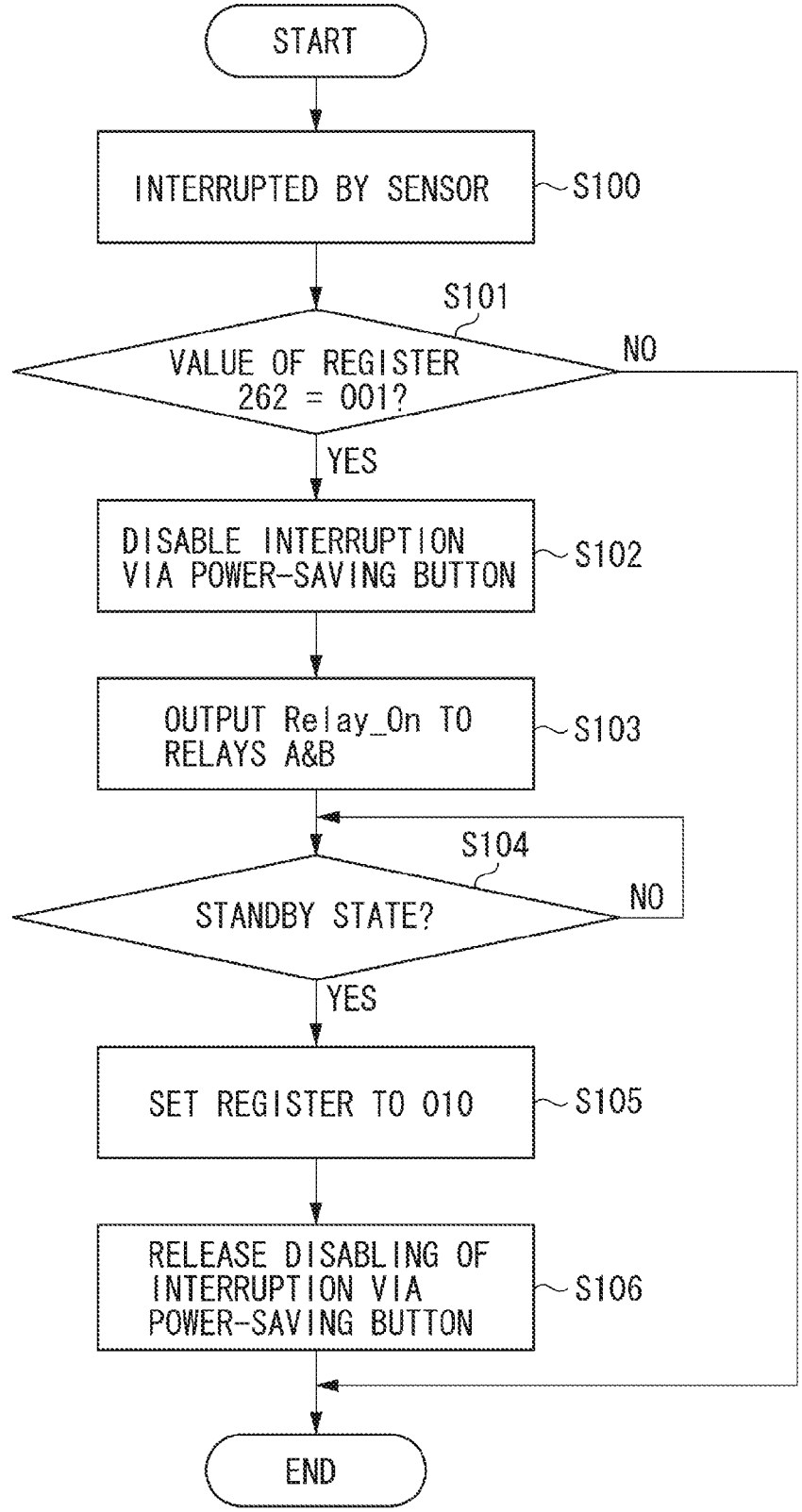

IMAGE FORMING APPARATUS, METHOD FOR CONTROLLING THEREOF, AND STORAGE MEDIUM

FIELD

Aspects of the present invention generally relate to an image forming apparatus having a sensor for detecting an object such as a person.

DESCRIPTION OF THE RELATED ART

Techniques for returning from a power-saving state when an image forming apparatus detects an object such as a person with a sensor provided in the image forming apparatus are known (see Japanese Patent Application Laid-Open No. 2012-118253). The image forming apparatus discussed in Japanese Patent Application Laid-Open No. 2012-118253 includes a sensor for detecting a moving object existing within a predetermined range around the image forming apparatus. When the sensor detects the moving object, the image forming apparatus shifts from a power-saving state to a standby state in which the power consumption amount is larger than that in the power-saving state.

The image forming apparatus discussed in Japanese Patent Application Laid-Open No. 2012-118253 includes, in addition to the above-described sensor, a power-saving button for shifting the power state in the image forming apparatus from the power-saving state to the standby state. In response to a pressing operation of the power-saving button by a user, the image forming apparatus shifts from the power-saving state to the standby state.

In some cases, the power-saving button has also a function, in addition to the function for shifting the power state in an image forming apparatus to return from the power-saving state to the standby state, for shifting the power state in the image forming apparatus from the standby state to the power-saving state (see Japanese Patent Application Laid-Open No. 2012-248961). In a state where a value of a power mode register indicating a power state in an image forming apparatus is "001" (indicating that the image forming apparatus is in a power-saving state), if the power-saving button is pressed, the image forming apparatus shifts the power state in the image forming apparatus from the power-saving state to the standby state. In a state where a value of the power mode register indicating a power state in the image forming apparatus is "010" (indicating that the image forming apparatus is in the standby state), if the power-saving button is pressed, the image forming apparatus shifts the power state in the image forming apparatus from the standby state to the power-saving state.

In such an image forming apparatus that shifts from the power-saving state to the standby state in response to the detection of an object such as a person by the sensor, after the detection of the object such as a person by the sensor, the image forming apparatus takes a predetermined period of time to return from the power-saving state to the standby state. This is because the device to which the power supply has started needs a predetermined time for the boot processing. Due to the booting operation, when the user arrives in front of the image forming apparatus, in some cases, the image forming apparatus has not returned to the standby state. In such a case, the user who has arrived in front of the image forming apparatus may mistakenly think that the image forming apparatus has not returned to the standby state, and press the power-saving button to instruct the image forming apparatus to return from the power-saving state to the standby state.

However, if the power-saving button is pressed while the image forming apparatus is shifting from the power-saving state to the standby state in response to the detection of the object by the sensor, the image forming apparatus determines that the pressing operation of the power-saving button is an instruction for shifting from the standby state to the power-saving state. This is because, at the time the object such as a person is detected by the sensor, the value of the power mode register in the image forming apparatus becomes to "010", and when the value of the register is "010", the power-saving button is pressed. As a result, after the shift from the power-saving state to the standby state, the image forming apparatus immediately shifts to the power-saving state.

SUMMARY

Aspects of the present invention are generally directed to an image forming apparatus capable of preventing an image forming apparatus from unnecessarily shifting to the power-saving state even if a power-saving button is pressed while the image forming apparatus is returning from the power-saving state in response to the detection of an object by a sensor.

According to an aspect of the present invention, an image forming apparatus includes a detection unit configured to detect an object, a reception unit configured to receive an operation of a user, and a shifting unit configured to shift, if the detection unit detects an object, the power state of the image forming apparatus from a first power state to a second state different from the first power state, and shift, if the reception unit receives an operation of a user, the power state in the image forming apparatus from the second power state to the first power state. The shifting unit, after detection of the object, according to the operation of the user received during the shift of the image forming apparatus to the second power state, prevents the image forming apparatus from shifting from the second power state to the first power state.

Further features of the present disclosure will become apparent from the following description of exemplary embodiments with reference to the attached drawings.

BRIEF DESCRIPTION OF THE DRAWINGS

FIG. 5 is a block diagram illustrating a power control unit in the image forming apparatus in detail.

FIG. 6 is a power transition diagram of the image forming apparatus.

FIG. 8 is a flowchart illustrating an operation performed by the power control unit in a case where an interruption is issued by the sensor.

DESCRIPTION OF THE EMBODIMENTS

Various exemplary embodiments will be described in detail below with reference to the drawings.

<Brief Description of Image Forming Apparatus>

Figure 1:
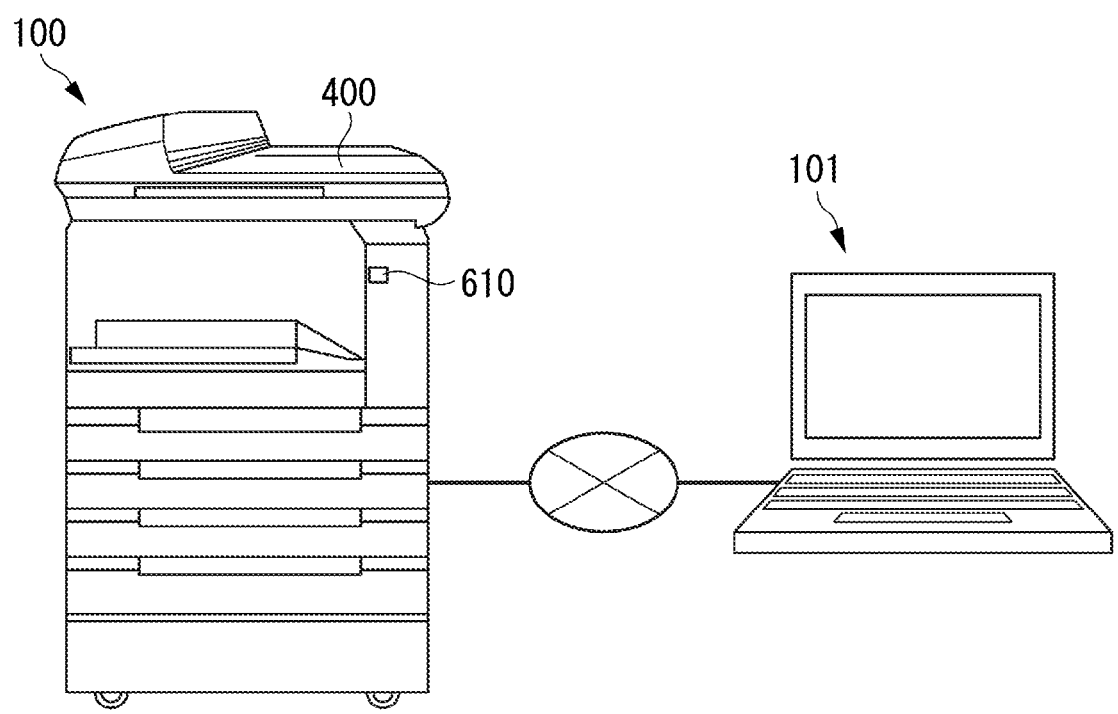
FIG. 1 is a front view illustrating an image forming apparatus according to a first exemplary embodiment.

As illustrated in FIG. 1, an image forming apparatus 100 according to a first exemplary embodiment is a multi-function peripheral (MFP) having a plurality of functions such as a copying function, a print function, a scanning function, and a facsimile function. In the present exemplary embodiment, as an example, the MFP is employed, however, the present exemplary embodiment is not limited to the MFP, and a single function peripheral (SFP) may be employed. The image forming apparatus 100 is connected to a communication network such as the Internet. The image forming apparatus 100 can, through the communication network, communicate with a single or a plurality of external devices 101 such as a personal computer (PC). The image forming apparatus 100 is connected to a telephone network. The image forming apparatus 100 can, through the telephone network, perform facsimile reception and facsimile transmission.

The image forming apparatus 100 according to the first exemplary embodiment includes a sensor 610 for detecting the approach of an object such as a person to the image forming apparatus 100. The sensor 610 can detect objects including living things such as humans and animals, and lifeless things such as robots. When the sensor detects an object such as a person, the image forming apparatus 100 shifts from a power-saving state (the first power state) (S2) to a standby state (the second power state) (S1). The power states in the image forming apparatus 100 will be described below.

Figure 2:
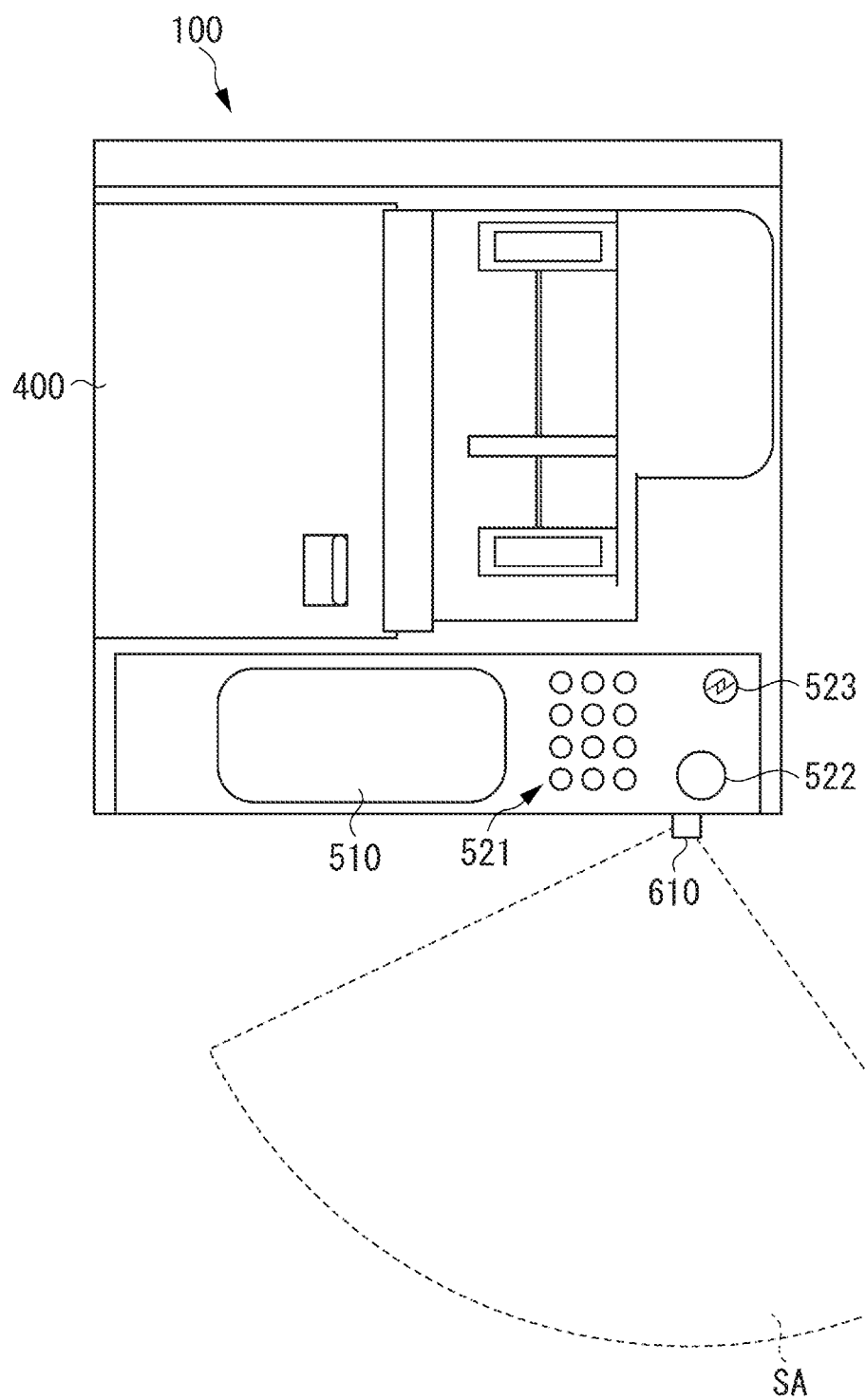
FIG. 2 is a plan view illustrating the image forming apparatus.

As illustrated in FIG. 1 and FIG. 2, the sensor 610 is mounted on the front side of the image forming apparatus 100. To detect an object existing in front of the image forming apparatus 100, the sensor 610 has a detection range SA in front of the image forming apparatus 100.

Figure 3:
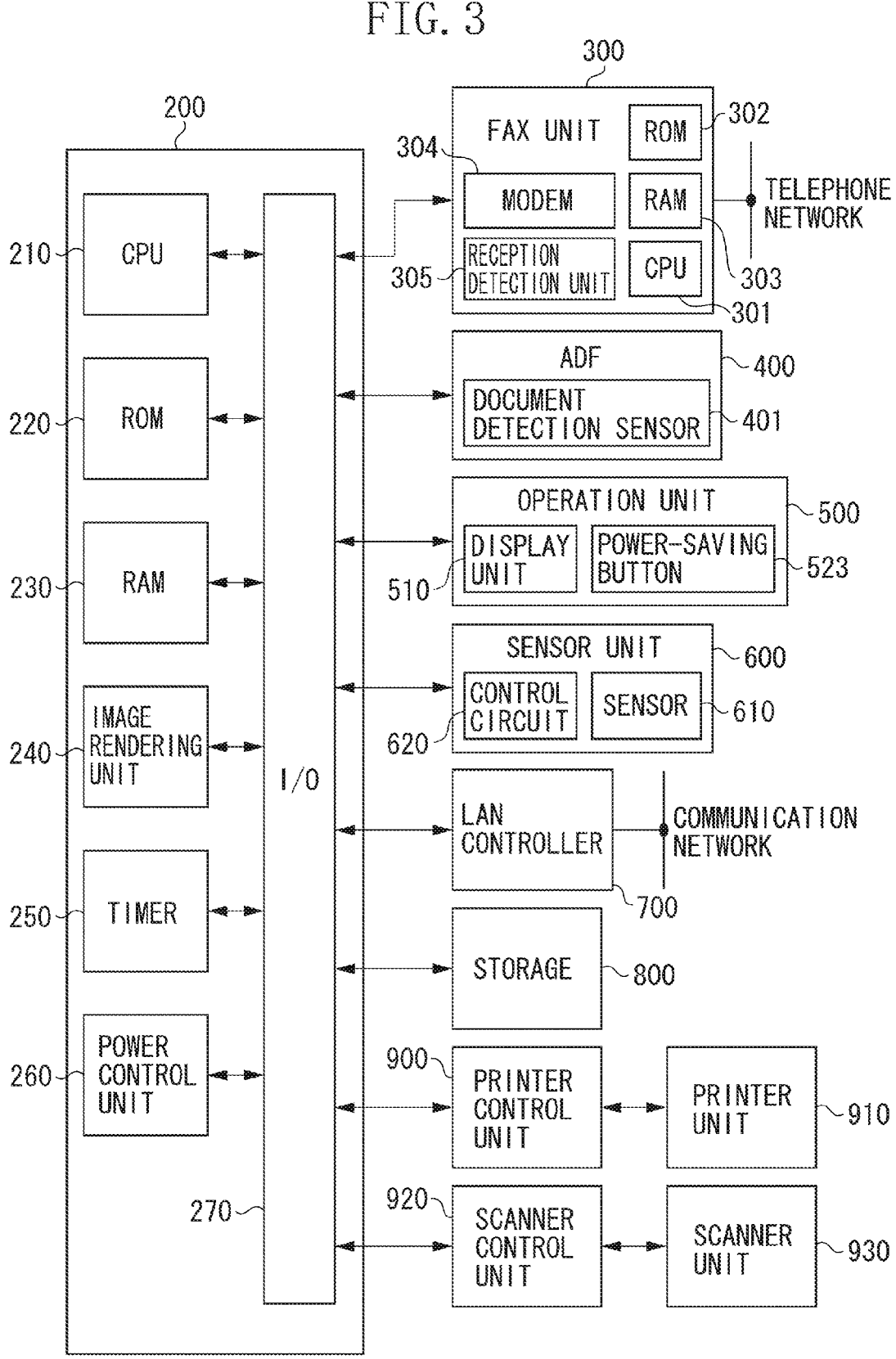
FIG. 3 is a hardware block diagram illustrating the image forming apparatus.

As illustrated in FIG. 3, the image forming apparatus 100 includes a controller unit 200, a fax unit 300, an auto document feeder (ADF) 400, an operation unit 500, a sensor unit 600, a local area network (LAN) controller 700, a storage 800, a printer control unit 900, a printer unit 910, a scanner control unit 920, and a scanner unit 930.

<About Controller Unit 200>

The controller unit 200 controls operation of each unit in the image forming apparatus 100. The controller unit 200 includes a central processing unit (CPU) 210, a read-only memory (ROM) 220, a random access memory (RAM) 230, an image rendering unit 240, a timer 250, and a power control unit 260.

The CPU 210 executes a software program for controlling the controller unit 200.

The ROM 220 stores a boot program of the image forming apparatus 100, various setting values, and other data.

The RAM 230 temporarily stores data to be used by the software program to be executed by the CPU 210.

The image rendering unit 240 performs image processing such as color space conversion on the image data read by the scanner unit 930 and the image data generated based on a page description language (PDL) data received from an external device 101. The image rendering unit 240 converts the image-processed image data into bitmap data. The bitmap data is output to the printer unit 910. The printer unit 910 forms an image on a sheet based on the bitmap data.

The timer 250 measures a period of time.

The power control unit 260 controls supply and interruption of the electric power to each unit in the image forming apparatus 100. The power control unit 260 will be described in detail below.

<About Fax Unit 300>

The fax unit 300, through the telephone network, performs facsimile reception and facsimile transmission. The fax unit 300 includes a CPU 301, a ROM 302, a RAM 303, a modem 304, and a reception detection unit 305.

The CPU 301 controls transmission and reception of a facsimile in cooperation with the controller unit 200.

The ROM 302 stores a boot program of the fax unit 300, various setting values, and other data.

The RAM 303 temporarily stores data to be used by the software program to be executed by the CPU 301.

The modem 304 performs modulation for the reception and transmission of a facsimile.

The reception detection unit 305 detects reception of a facsimile. The reception detection unit 305, in response to the reception of the facsimile, sends an interruption signal Interrupt_F to the power control unit 260.

<About ADF 400>

The ADF 400 automatically feeds a document to a document reading unit (not illustrated) of the scanner unit 930. The ADF 400 includes a document detection sensor 401 for detecting a document that is set. The document detection sensor 401, in response to the detection of the placement of a document, sends an interruption signal Interrupt_D to the power control unit 260.

<About Operation Unit 500>

The operation unit 500 includes a display unit 510 and various keys 520.

The display unit 510 displays a status screen for displaying a status of the image forming apparatus 100, a setting screen for inputting information necessary to perform the copy function and the facsimile function.

As illustrated in FIG. 2, the various keys 520 include numeric keypads 521, a start key 522, and a power-saving button 523. The power-saving button 523 is provided to shift the power state of the image forming apparatus 100. The power-saving button 523 receives an operation of a user. When the user presses the power-saving button 523 in a state where the image forming apparatus 100 is in the power-saving state (S2), the image-forming apparatus 100 shifts from the power-saving state (S2) to the standby state (S1). When the user presses the power-saving button 523 in a state the image forming apparatus 100 is in the standby state (S1), the image-forming apparatus 100 shifts from the standby state (S1) to the power-saving state (S2). When the power-saving button 523 is pressed, to the power control unit 260, an interruption signal Interrupt_O is sent.

<About Sensor Unit 600>

Figure 7A:
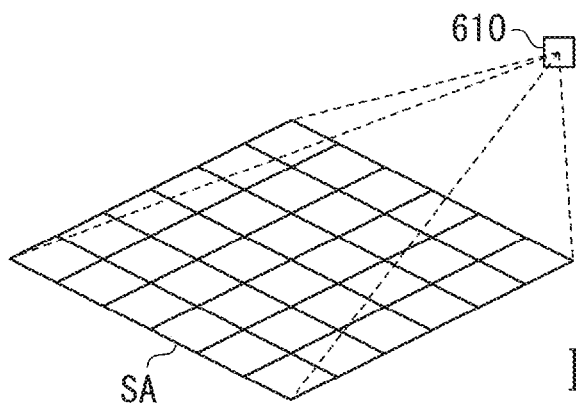
FIGS. 7A, 7B, 7C, and 7D illustrate detection states of a sensor in the image forming apparatus.
Figure 7B:
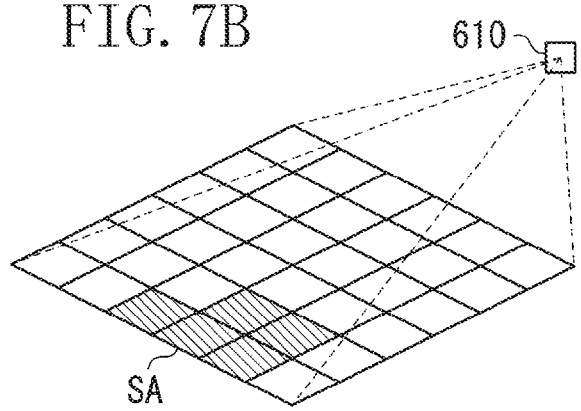
Figure 7C:
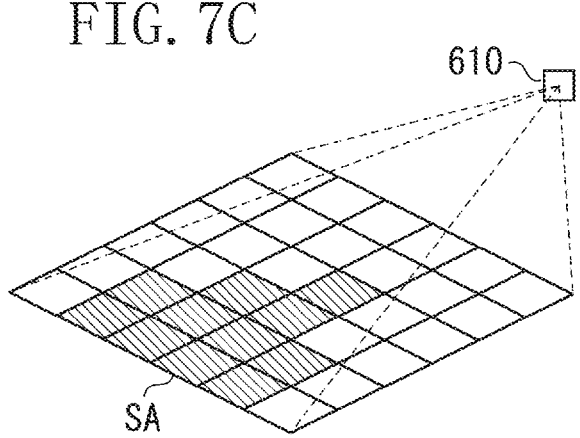
Figure 7D:
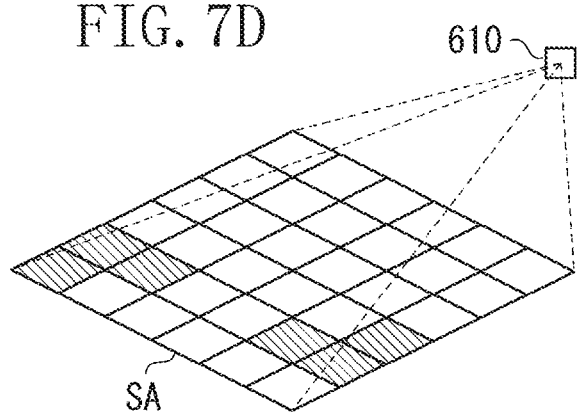

As illustrated in FIG. 3, the sensor unit 600 includes the above-mentioned sensor 610, and a control circuit 620 for analyzing a detection result of the sensor 610. The sensor 610 is an infrared array sensor having a plurality of detection units arranged in matrix. Each detection unit is a passive sensor that receives infrared light emitted from a heat source such as a person, converts the received infrared light into an electrical signal, and outputs the signal. The detection unit according to the present exemplary embodiment is an element for detecting infrared light based on a pyroelectric effect. The detection unit used in the sensor 610 is not limited to the above-described passive sensor, and alternatively, an active sensor that emits infrared light to an object and receives the light reflected from the object may be employed. The control circuit 620, based on the electrical signals output from the individual units in the sensor 610, determines whether the object has approached the image forming apparatus 100. When the control circuit 620 determines that the object has approached the image forming apparatus 100, the control circuit 620 outputs an interruption signal Interrupt_S to the power control unit 260. FIG. 7A illustrates a state where none of the plurality of the detection units has detected an object. FIG. 7B illustrates a state where a part of the detection units (in FIG. 7B, five detection units) have detected an object. FIG. 7C illustrates a state where a part of the detection units (in FIG. 7C, eleven detection units) have detected an object. The control circuit 620 according to the first exemplary embodiment, when 10 or more detection units have detected an object, determines that the object has approached the image forming apparatus 100. Then, the control circuit 620 outputs an interruption signal Interrupt_S to the power control unit 260. In the present exemplary embodiment, when 10 or more detection units detect an object, the control circuit 620 determines that the object has approached the image forming apparatus 100, however, the number of the detection units for detecting an object is not limited to 10. Further, even though the number of the detection units for detecting an object is equal to or greater than 10, as illustrated in FIG. 7D, when the detection units detecting the object are not adjacent to each other, the control circuit 620 does not determine that the object has approached the image forming apparatus 100.

The sensor 610 is not limited to the above-described infrared array sensor. For example, the sensor 610 may be an infrared line sensor that has infrared sensors arranged in line. Alternatively, the sensor 610 may be a pyroelectric array sensor that has pyroelectric sensors arranged in matrix, and determine the existence of a person by detecting infrared light emitted from the person and based on the amount of shift. Alternatively, the sensor 610 may be a pyroelectric line sensor that has pyroelectric sensors arranged in line. The sensor 610 may include the above-described infrared sensor and pyroelectric sensor. As the sensor 610, a camera may be used. In the method of determining whether an object has approached the image forming apparatus 100, as described above, when the elements of a predetermined number detect the object, it is determined that the object has approached the image forming apparatus 100.

<About LAN Controller 700>

As illustrated in FIG. 3, the LAN controller 700, via the communication network, receives data transmitted from the external device 101. To the LAN controller 700, electric power is supplied in the power-saving state (S2). In the power-saving state (S2), when the LAN controller 700 receives a packet such as a print request from the external device 101, the LAN controller 700 outputs an interruption signal Interrupu_L to the power control unit 260. Then, the LAN controller 700 shifts to the standby state (S1) in which the packet can be processed. The LAN controller 700 also has a proxy response function for replying to a packet when the LAN controller 700 receives the packet such as an inquiry of a state from the external device 101 while remaining in the power-saving state (S2).

<About Storage 800>

The storage 800 is a hard disk drive (HDD). As an alternative to the HDD, a solid state drive (SSD) can be used as the storage 800.

<About Printer Control Unit 900>

The printer control unit 900 controls the printer unit 910 for forming an image on recording paper, for example, according to an electrophotographic method. To the printer control unit 900, electric power is supplied from a third power supply unit 153 in the power supply device 150 described below.

<About Scanner Control Unit 920>

The scanner control unit 920 controls the scanner unit 930 for optically reading an image formed on a document. To the scanner control unit 920, electric power is supplied from the third power supply unit 153 in the power supply device 150 described below.

<About Power Supply Device 150>

The image forming apparatus 100 includes the power supply device 150 for supplying electric power to the above-described blocks.

Figure 4:
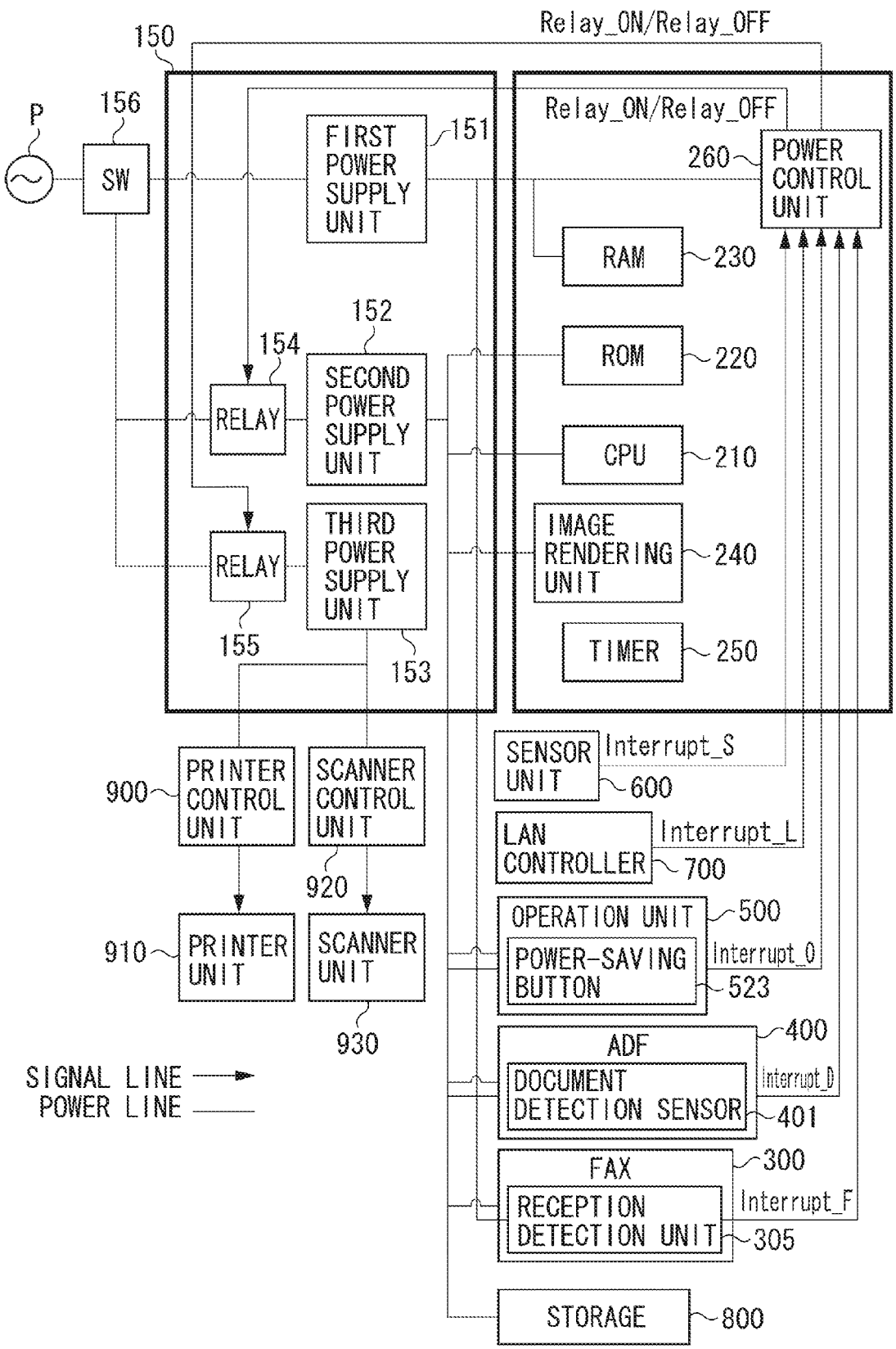
FIG. 4 is a block diagram illustrating a power system in the image forming apparatus.

As illustrated in FIG. 4, the power supply device 150 converts the alternating voltage supplied from an alternating-current power supply P into the direct voltage, and supplies the electric power to each unit in the image forming apparatus 100. The power supply device 150 includes a first power supply unit 151 for generating the voltage of 3.3 V, a second power supply unit 152 for generating the voltage of 12 V, and the third power supply unit 153 for generating the voltage of 24 V. The power supply device 150 includes a relay 154 for switching between input and interruption of the alternating voltage to the second power supply unit 152, and a relay 155 for switching between input and interruption of the alternating voltage to the third power supply unit 153. The power control unit 260 in the controller unit 200 switches between the on state and the off state of the relay 154 and the relay 155. Specifically, the power control unit 260, to the relay 154, outputs a Relay_ON signal to set the relay 154 to the on state, and outputs a Relay_OFF signal to set the relay 154 to the off state. The power control unit 260, to the relay 155, outputs a Relay_ON signal to set the relay 155 to the on state, and outputs a Relay_OFF signal to set the relay 155 to the off state.

Between the above-described power supply units (the first power supply unit 151, the second power supply unit 152, and the third power supply unit 153) and the alternating-current power supply P, a switch 156 is provided. The user can switch the on state and the off state of the switch 156. When the user sets the switch 156 to the on state, electric power is supplied from the alternating-current power supply P to the image forming apparatus 100. When the user sets the switch 156 to the off state, electric power being supplied from the alternating-current power supply P to the image forming apparatus 100 is interrupted.

The first power supply unit 151 supplies generated voltage to the power control unit 160 in the controller unit 200, and the RAM 230. The first power supply unit 151 also supplies the generated voltage to the sensor unit 600, the LAN controller 700, the power-saving button 523 in the operation unit 500, the document detection sensor 401 in the ADF 400, and the reception detection unit 305 in the fax unit 300.

The second power supply unit 152 supplies the generated voltage to the CPU 210, the ROM 220, and the image rendering unit 240 in the controller unit 200. The second power supply unit 152 also supplies the generated voltage to parts (for example, a backlight (not illustrated)) other than the power-saving button 523 in the operation unit 500. The second power supply unit 152 also supplies the generated voltage to parts other than the document detection sensor 401 in the ADF 400, and parts (the CPU 301, the ROM 302, the RAM 303, and the modem 304) other than the reception detection unit 305 in the fax unit 300.

The third power supply unit 153 supplies the generated voltage to the printer control unit 900 and the scanner control unit 920.

<About Power Control Unit 260>

Referring to FIG. 5, the power control unit 260 is described in detail.

The power control unit 260 is a complex programmable logic device (CPLD).

The power control unit 260 includes an interruption signal input unit 261, a power mode register (hereinafter, referred to as register) 262, a flag (variable) 263, a power control signal output unit 264, and a power management unit 265. When the power control unit 260 receives the above-described interruption signals Interrupt_S, Interrupt_L, Interrupt_O, Interrupt_D, or Interrupt_F, depending on the value of the register 262, performs power control of each unit in the image forming apparatus 100.

The interruption signal input unit 261 receives the above-described interruption signals Interrupt_S, Interrupt_L, Interrupt_O, Interrupt_D, or Interrupt_F.

The register 262 stores the information indicating a power state of the image forming apparatus 100. Specifically, when the power state of the image forming apparatus 100 is in the standby state (S1), "010" is set to the register 262. When the power state of the image forming apparatus 100 is in the power-saving state (S2), "001" is set to the register 262. When the power state of the image forming apparatus 100 is in the power-off state (S3), "100" is set to the register 262.

To a flag 263, the information indicating whether to enable the interruption signal Interrupt_O from the power-saving button 523 is set. Specifically, when the flag 263 is set to "00", the power management unit 265 ignores the interruption signal Interrupt_O from the power-saving button 523. On the other hand, when the flag 263 is set to "11", the power control signal output unit 264, in response to the interruption signal Interrupt_O from the power-saving button 523, outputs the Relay_ON signal or the Relay_OFF signal.

The power control signal output unit 264 outputs the Relay_ON signal or the Relay_OFF signal.

The power management unit 265, when the interruption signal input unit 261 receives an interruption signal, based on the information indicated by the register 262 and the flag 263, controls the power control signal output unit 264 to output the Relay_ON signal or the Relay_OFF signal.

<Power Transition Diagram of Image Forming Apparatus 100>

FIG. 6 is a power transition diagram of the image forming apparatus 100. The image forming apparatus 100 has three states of the standby state (S1), the power-saving state (S2), and the power-off state (S3).

In the standby state (S1), electric power is supplied to each unit such as the printer unit 910 and the scanner unit 930 in the image forming apparatus 100. In the standby state, printing by the printer unit 910 and reading of a document by the scanner unit 930 can be performed. In the standby state (S1), the relay 154 and the relay 155 are in the on state. In this state, electric power is supplied, from the second power supply unit 152, to the CPU 210, the ROM 220, the image rendering unit 240, the operation unit 500 (except for the power-saving button 523), the ADF 400 (except for the document detection sensor 401), the fax unit 300 (except for the reception detection unit 305), and the storage 800. In the standby state (S1), electric power is supplied from the third power supply unit 153 to the printer control unit 900 and the scanner control unit 920. In the standby state (S1), electric power is supplied from the first power supply unit 151 to the sensor unit 600, the LAN controller 700, the power-saving button 523 in the operation unit 500, the document detection sensor 401 in the ADF 400, and the reception detection unit 305 in the fax unit 300.

In the power-saving state (S2), the power consumption amount is smaller than that in the standby state (S1). In the power-saving state (S2), the power supply to the printer unit 910 and the scanner unit 930 in the image forming apparatus 100 is stopped. In the power-saving state, printing by the printer unit 910 and reading of a document by the scanner unit 930 cannot be performed. In the power-saving state (S2), the relay 154 and the relay 155 are in the off state. In this state, power supply from the second power supply unit 152 and the third power supply unit 153 is stopped. In the power-saving state (S2), electric power is supplied from the first power supply unit 151 to the RAM 230, the power control unit 260, the sensor unit 600, the LAN controller 700, the power-saving button 523 in the operation unit 500, the document detection sensor 401 in the ADF 400, and the fax unit 300.

In the power-saving state (S2), when one of the following conditions for shifting to the standby-state (S1) is satisfied, the power-saving state (S2) is shifted to the standby state (S1).

The sensor 610 has detected an object.

The power-saving button 523 has been pressed.

The LAN controller 700 has received data such as a print request.

The reception detection unit 305 in the fax unit 300 has received a facsimile.

The document detection sensor 401 in the ADF 400 has detected a document.

In the standby state (S1), when one of the following conditions for shifting to the power-saving state (S2) is satisfied, the standby state (S1) is shifted to the power-saving state (S2).

A predetermined period of time has passed without receiving data such as a print request by the LAN controller 700.

A predetermined period of time has passed without operation of the operation unit 500.

The power-saving button 523 has been pressed.

In the image forming apparatus 100 according to the present exemplary embodiment, when one of the above-described conditions is satisfied, the image forming apparatus 100 may shift from the standby state (S1) to the power-saving state (S2). Above-described conditions are just examples. For example, when the LAN controller 700 has not received data such as a print request and a predetermined time has elapsed without operation of the operation unit 500, the image forming apparatus 100 may shift to the power-saving state (S2).

In the power-off state (S3), the power consumption amount is smaller than that in the power-saving state (S2). In the power-off state (S3), the switch 156 is turned off by the user. In this state, power supply to each unit in the image forming apparatus 100 is stopped.

In the standby state (S1) or the power-saving state (S2), when the user turns off the switch 156, the image forming apparatus 100 enters the power-off state (S3). In the power-off state (S3), when the user turns on the switch 156, the image forming apparatus 100 enters the standby state (S1). In the power-off state (S3), when the user turns on the switch 156, the image forming apparatus 100 may enter the power-saving state (S2).

The image forming apparatus 100 may be in any power state other than the above-described three power states. For example, the image forming apparatus 100 may enter, other than the above-described power states, a suspend state, and a hibernation state. In the suspend state, the image forming apparatus 100 can return to the standby state (S1) at high speed. In the suspend state, the power supply to the RAM 230 is maintained. The image forming apparatus 100 starts up to the standby state (S1) using the state of the image forming apparatus 100 stored in the RAM 230. Also in the hibernation state, the image forming apparatus 100 can return to the standby state (S1) at high speed. In the hibernation state, the power state is similar to that in the power-off state (S3), and the power supply to each unit in the image forming apparatus 100 is stopped. The hibernation state is different from the power-off state (S3) in that prior to the shift to the hibernation state, the state of the image forming apparatus 100 is stored in the storage 800. In returning from the hibernation state to the standby state (S1), the image forming apparatus 100 returns at high speed based on the information stored in the storage 800.

<About Operation Performed by Power Control Unit 260 when Interruption is Issued by Sensor 610>

Referring to FIG. 8, an operation performed by the power control unit 260 when an interruption is issued by the sensor 610 is described. The following operation is executed by the power control unit 260 by executing a program according to the flowchart in FIG. 8.

In step S100, when the sensor 610 detects an object and the control circuit 620 determines that the object has approached the image forming apparatus 100, an interruption signal Interrupt_S by the sensor 610 is input to the power control unit 260. In step S101, the power control unit 260 to which the interruption signal Interrupt_S has been input checks the value of the register 262. If the value of the register 262 is "010" (the information indicating that the power state in the image forming apparatus 100 is the standby state (S1)) (NO in step S101), the processing in the power control unit 260 ends. If the value of the register 262 is "001" (the information indicating that the power state in the image forming apparatus 100 is the power-saving state (S2)) (YES in step S101), in step S102, the interruption by the power-saving button 523 is disabled. Specifically, the power management unit 265 in the power control unit 260 sets the flag 263 to "00". By the operation, an interruption from the power-saving button 523 is prevented while the image forming apparatus 100 is returning from the power-saving state to the standby state. In step S103, the power control unit 260 outputs the Relay_ON signal to the relay 154 and the relay 155. Through the operation, the relay 154 and the relay 155 enter the on state, electric power is supplied from the second power supply unit 152 to the CPU 210 and other units, and also electric power is supplied from the third power supply unit 153 to the printer control unit 900 and other units. The above-described "disabling the interruption by the power-saving button 523" means that even though an interruption signal Interrupt_O is input through the power-saving button 523, the power management unit 265 performs control to ignore the signal Interrupt_O. In the operation of "disabling the interruption by the power-saving button 523", control may be performed so as not to input the interruption signal Interrupt_O in the power control unit 260.

In step S104, the power control unit 260 determines whether the power state in the image forming apparatus 100 has entered the standby state (S1). Specifically, when the power control unit 260 is notified from the CPU 210 that the power state in the image forming apparatus 100 has entered the standby state (S1), the power control unit 260 determines that the power state of the image forming apparatus 100 has entered the standby state (S1) (YES in step S104). When the power control unit 260 is notified from the CPU 210 that the power state in the image forming apparatus 100 has entered the standby state (S1) (YES in step S104), in step S105, the power control unit 260 sets the value of the register 262 to "010". Then, the power control unit 260 releases the disable state of the interruption by the power-saving button 523. Specifically, in step S106, the power control unit 260 sets the flag 263 to "11".

<About Operation Performed by Power Control Unit 260 when Interruption is Issued Via Power-Saving Button 523>

Figure 9:
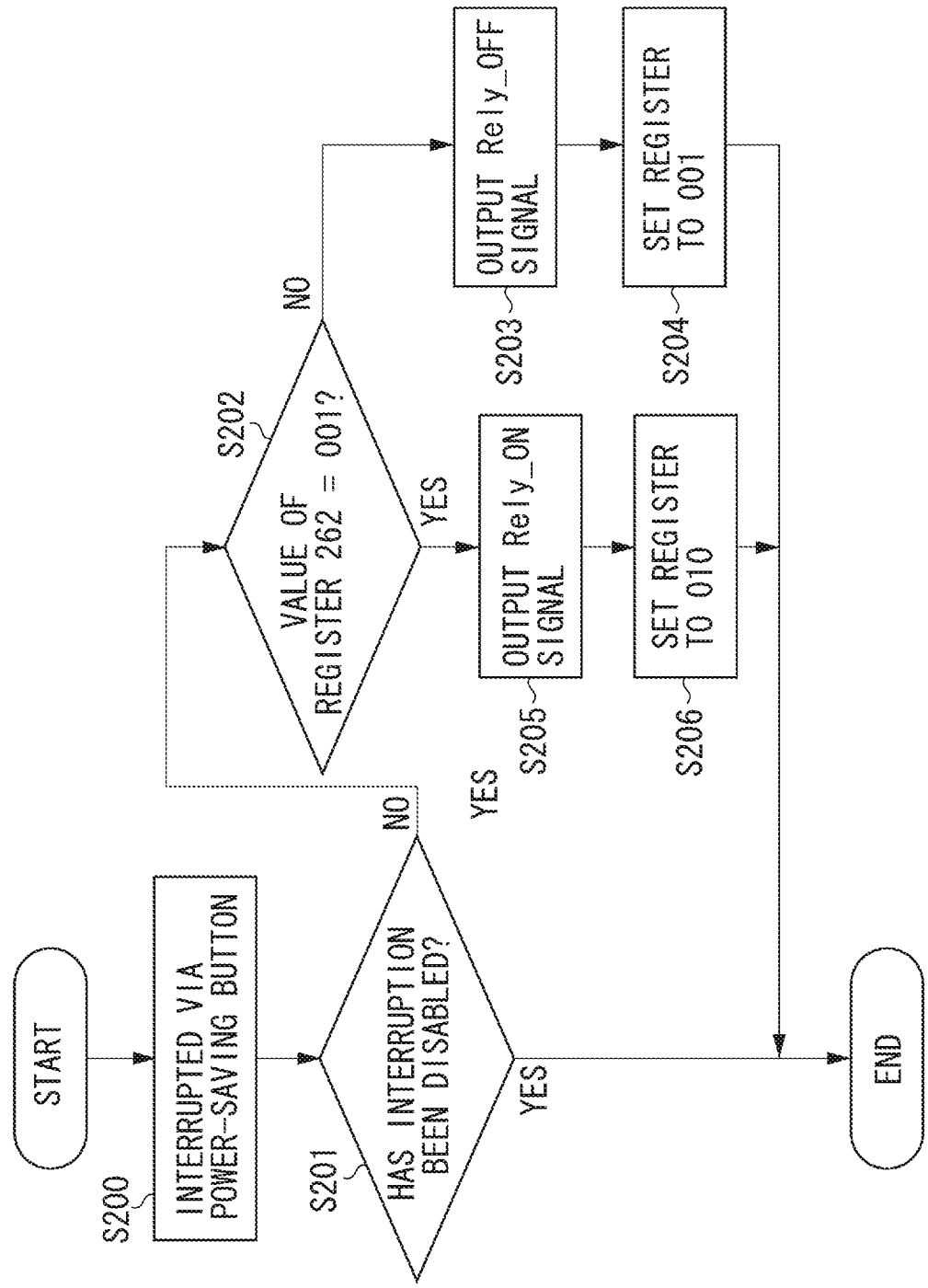
FIG. 9 is a flowchart illustrating an operation performed by the power control unit in a case where an interruption is issued via the power-saving button.

Referring to FIG. 9, an operation performed by the power control unit 260 when an interruption is issued via the power-saving button 523 is described. The following operation is executed by the power control unit 260 executing the program according to the flowchart in FIG. 9.

In step S200, when the power-saving button 523 is pressed, the interruption signal Interrupt_O via the power-saving button 523 is input in the power control unit 260. In step S201, the power control unit 260 to which the interruption signal Interrupt_O has been input determines whether the interruption by the power-saving button 523 has been disabled. Specifically, the power control unit 260 determines whether the flag 263 has been set to "00". If the flag 263 has been set to "00" (YES in step S201), the processing in the power control unit 260 ends.

If the flag 263 has been set to "11" (NO in step S201), in step S202, the power control unit 260 checks the value of the register 262. If the value of the register 262 is "010" (the information indicating that the power state in the image forming apparatus 100 is the standby state (S1)) (NO in step S202), in step S203, the power control unit 260 outputs the Relay_OFF signal to each of the relay 154 and the relay 155. By the operation, the relay 154 and the relay 155 enter the off state, the electric power supplied from the second power supply unit 152 to the CPU 210 and other units is stopped, and also the electric power supplied from the third power supply unit 153 to the printer control unit 900 and other units is stopped. In step S204, the power control unit 260 sets the value of the register 262 to "001". Specifically, when the power control unit 260 is notified from the CPU 210 that the power state in the image forming apparatus 100 is in the power-saving state (S2), the power control unit 260 sets the value of the register 262 to "001".

If the value of the register 262 is "001" (the information indicating that the power state in the image forming apparatus 100 is the power-saving state (S2)) (YES in step S202), in step S205, the power control unit 260 outputs the Relay_ON signal to the relay 154 and the relay 155. Through the operation, the relay 154 and the relay 155 enter the on state, electric power is supplied from the second power supply unit 152 to the CPU 210 and other units, and also electric power is supplied from the third power supply unit 153 to the printer control unit 900 and other units. In step S206, the power control unit 260 sets the value of the register 262 to "010". Specifically, when the power control unit 260 is notified from the CPU 210 that the power state in the image forming apparatus 100 is in the standby state (S1), the power control unit 260 sets the value of the register 262 to "010".

In the first exemplary embodiment, while the image forming apparatus 100 is returning from the power-saving state (S2) by an interruption from the sensor 610, even if the power-saving button 523 is pressed, the image forming apparatus 100 can be prevented from shifting to the power-saving state (S2).

<About Operation Performed by Power Control Unit 260 when Interruption is Issued Due to Other Conditions>

Figure 10:
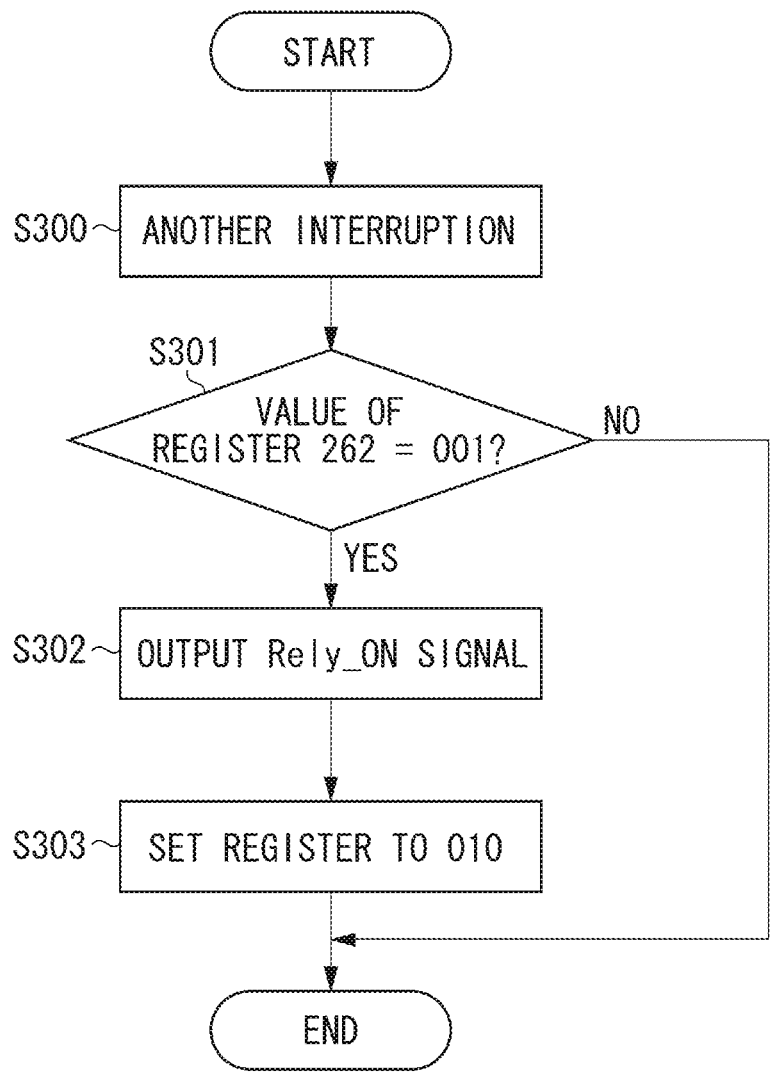
FIG. 10 is a flowchart illustrating an operation performed by the power control unit in a case where an interruption due to another condition is issued.

Referring to FIG. 10, an operation of the power control unit 260 to be performed when an interruption (one of the following three conditions) other than the interruption by the sensor 610 and the interruption via the power-saving button 523 is issued, is described. The following operation is executed by the power control unit 260 executing the program according to the flowchart in FIG. 10.

When the LAN controller 700 receives a specific packet such as a print request from the external device 101 (i.e., an interruption signal Interrupt_O is input to the power control unit 260).

The document detection sensor 401 detects a document (i.e., an interruption signal Interrupt_D is input to the power control unit 260).

The reception detection unit 305 receives facsimile data (i.e., an interruption signal Interrupt_F is input to the power control unit 260).

In step S300, when the above-described interruption is issued, in step S301, the power control unit 260 checks the value of the register 262. If the value of the register 262 is "010" (the information indicating that the power state in the image forming apparatus 100 is the standby state (S1) (NO in step S301), the processing by the power control unit 260 ends. If the value of the register 262 is "001" (the information indicating that the power state in the image forming apparatus 100 is the power-saving state (S2)) (YES in step S301), in step S302, the power control unit 260 outputs the Relay_ON signal to the relay 154 and the relay 155. Through the operation, the relay 154 and the relay 155 enter the on state, electric power is supplied from the second power supply unit 152 to the CPU 210 and other units, and also electric power is supplied from the third power supply unit 153 to the printer control unit 900 and other units. In step S303, the power control unit 260 sets the value of the register 262 to "010". Specifically, when the power control unit 260 is notified from the CPU 210 that the power state in the image forming apparatus 100 is in the standby state (S1), the power control unit 260 sets the value of the register 262 to "010".

In the first exemplary embodiment, when the image forming apparatus 100 returns to the standby state (S1), the disable state of an interruption by the power-saving button 523 is released. In a second exemplary embodiment, after the interruption by the power-saving button 523 is disabled, when a predetermined period of time has passed, the disable state of the power-saving button 523 is released.

Figure 11:
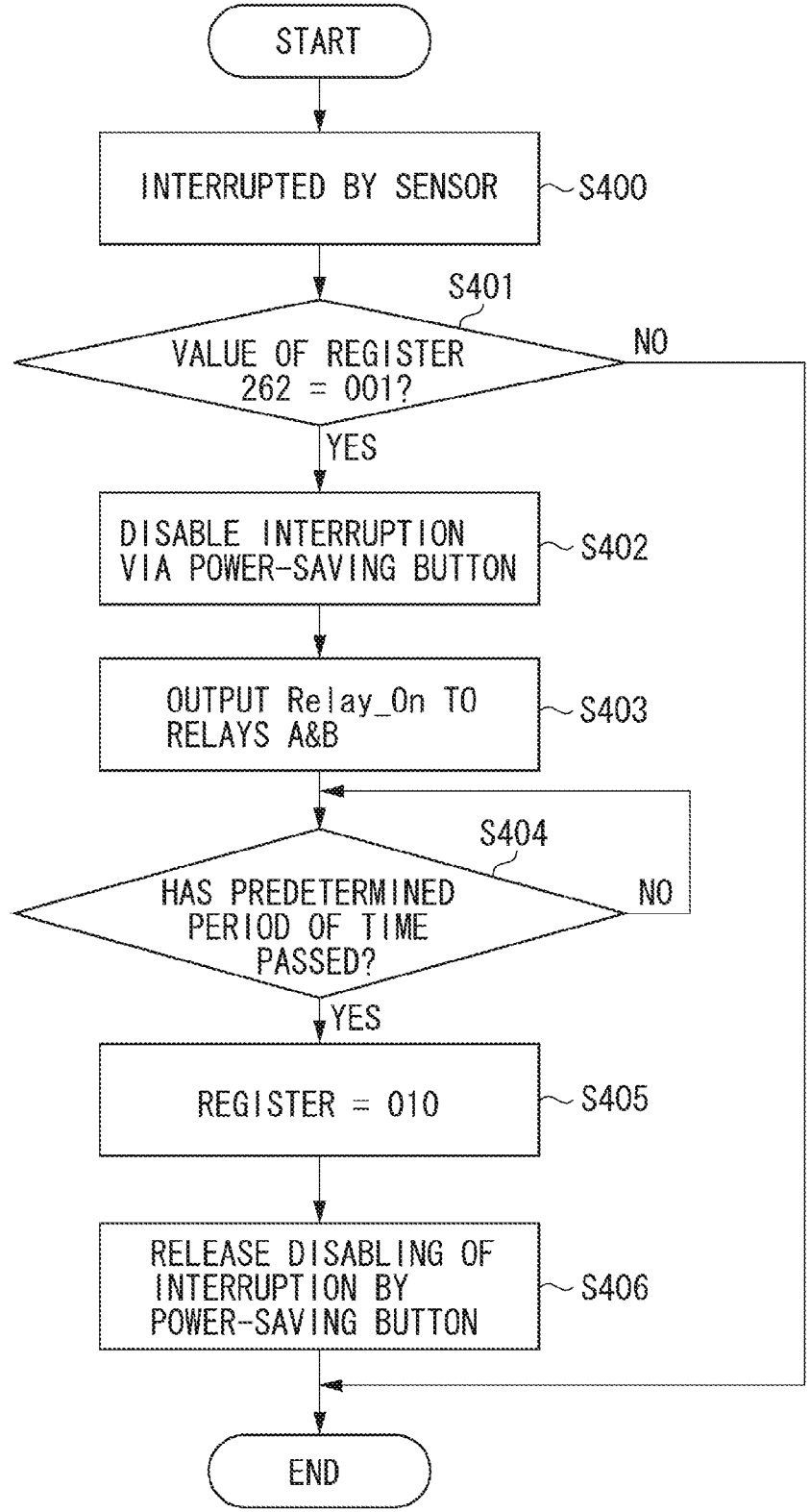
FIG. 11 is a flowchart illustrating an operation performed by the power control unit in a case where an interruption is issued by a sensor in an image forming apparatus according to a second exemplary embodiment.
Figure 12:
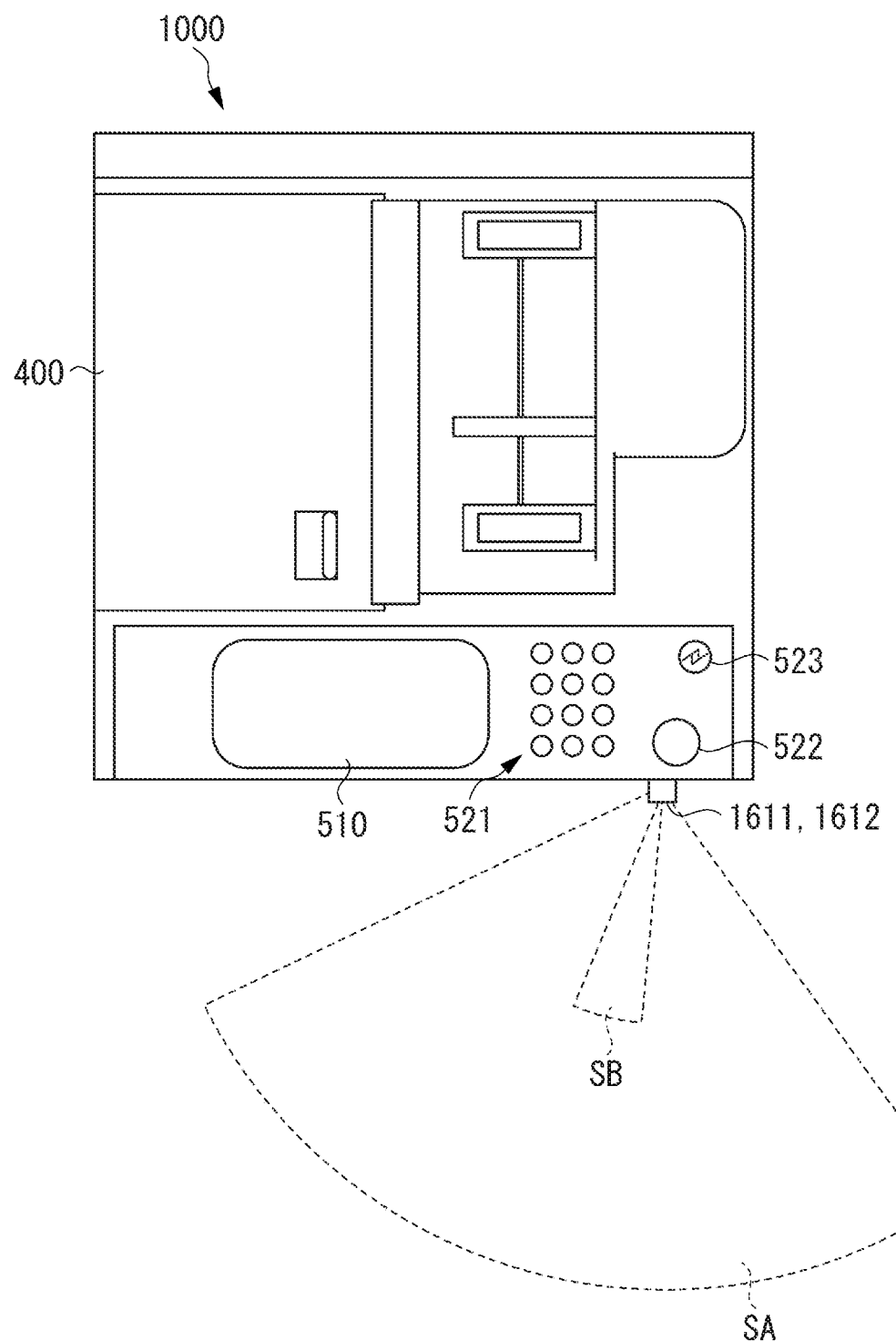
FIG. 12 is a plan view illustrating an image forming apparatus according to a third exemplary embodiment.
Figure 13:
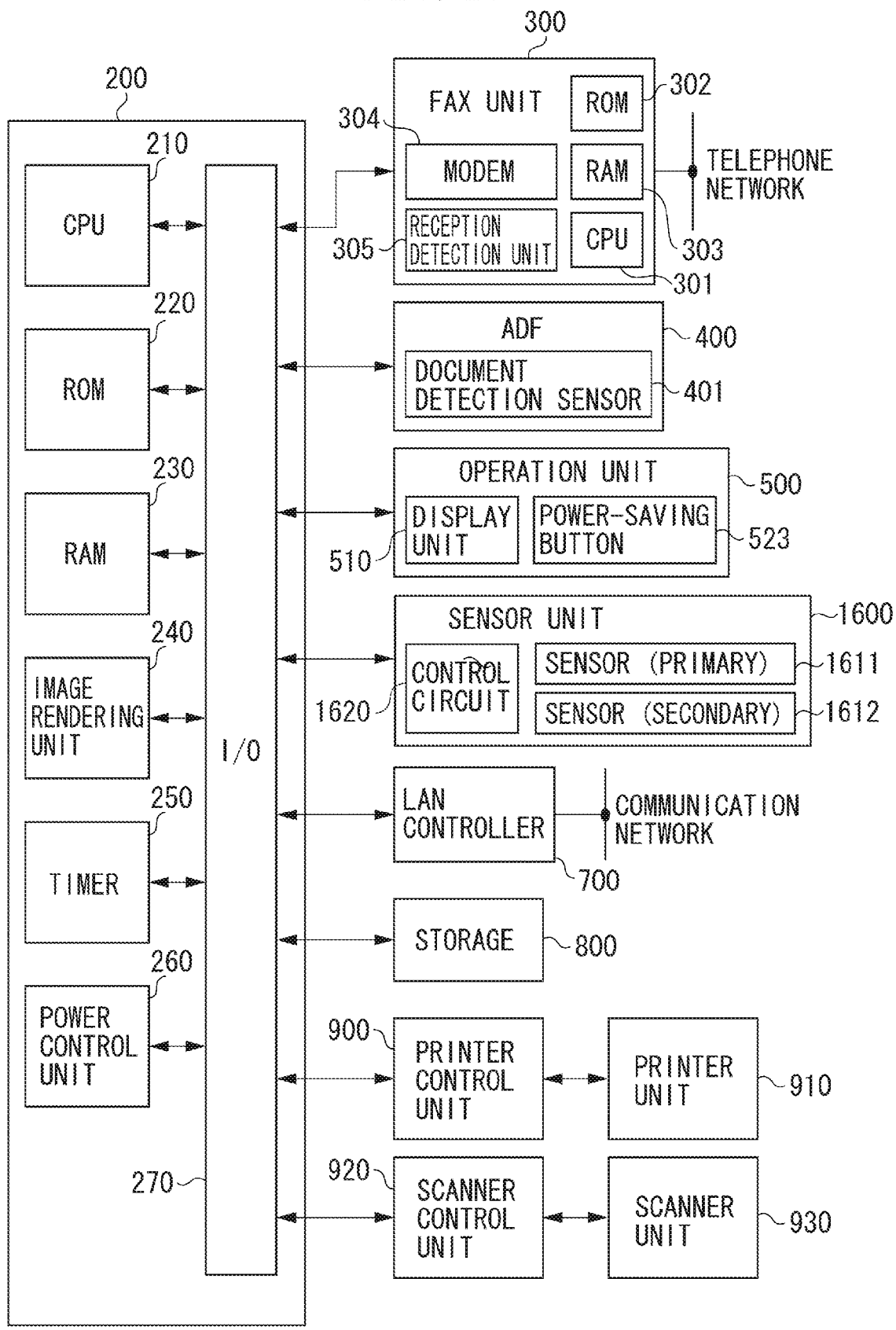
FIG. 13 is a hardware block diagram illustrating the image forming apparatus according to the third exemplary embodiment.

With reference to FIG. 11, an operation performed by the power control unit 260 when an interruption is issued by the sensor 610 is described. The following operation is executed by the power control unit 260 executing a program according to the flowchart in FIG. 11.

In step S400, when the sensor 610 determines that the object has approached the image forming apparatus 100, an interruption signal by the sensor 610 is input to the power control unit 260. In step S401, the power control unit 260 to which the interruption signal has been input checks the value of the register 262. If the value of the register 262 is "010" (the information indicating that the power state in the image forming apparatus 100 is the standby state (S1)) (NO in step S401), the processing by the power control unit 260 ends. If the value of the register 262 is "001" (the information indicating that the power state in the image forming apparatus 100 is the power-saving state (S2)) (YES in step S401), in step S402, the interruption by the power-saving button 523 is disabled. Specifically, in step S402, the power control unit 260 sets the flag 263 of the power control unit 260 to "00". In step S403, the power control unit 260 outputs the Relay_ON signal to the relay 154 and the relay 155. Through the operation, the relay 154 and the relay 155 enter the on state, electric power is supplied from the second power supply unit 152 to the CPU 210 and other units, and also electric power is supplied from the third power supply unit 153 to the printer control unit 900 and other units.

In step S404, the power control unit 260, after disabling the interruption by the power-saving button 523, determines whether a predetermined period of time has passed. Specifically, if the power control unit 260 determines that a predetermined period of time has passed (YES in step S404), in step S405, the power control unit 260 sets the value of the register 262 to "010". Then, the power control unit 260 releases the disable state of the interruption via the power-saving button 523. Specifically, in step S406, the power control unit 260 sets the flag 263 of the power control unit to "11".

In the above-described first exemplary embodiment, the infrared array sensor is used as the sensor 610. A sensor unit 1600 in an image forming apparatus 1000 according to a third exemplary embodiment includes a primary sensor 1611, a secondary sensor 1612, and a control circuit 1620.

The primary sensor 1611 detects a motion of an object around the image forming apparatus 1000. The primary sensor 1611 is an infrared sensor using a pyroelectric effect of a pyroelectric element. The detection range SA of the primary sensor 1611 is wider than the detection range SB of the secondary sensor 1612. When a motion of an object such as a person is detected in the detection range SA of the primary sensor 1611, the primary sensor 1611 outputs a detection signal to a control circuit 1620. When the primary sensor 1611 detects the motion of the object, electric power is supplied to the secondary sensor 1612. Through the operation, the secondary sensor 1612 starts detection operation of an object.

The secondary sensor 1612 detects existence of an object such as a person. The secondary sensor 1612 is a reflection type infrared sensor having an output unit for outputting infrared light, and a light reception unit for receiving the reflected light of the infrared light output from the output unit. The detection range SB of the secondary sensor 1612 is smaller than the detection range SA of the primary sensor 1611. When the secondary sensor 1612 detects existence of an object, the secondary sensor 1612 outputs a detection signal to a control circuit 1620. If the secondary sensor 1612 detects the existence of the object, the control circuit 1620 outputs the interruption signal Interrupt_S by the sensor to the power control unit 260.

The operation of the power control unit 260 that has received the interruption signal Interrupt_S is similar to that in FIG. 8 according to the first exemplary embodiment, and consequently, the description thereof is omitted.

Other Exemplary Embodiments

While the present disclosure has made reference to exemplary embodiments, it is to be understood that these specific exemplary embodiments are not seen to be limiting, and various modifications can be made without departing from the scope of the disclosure. Further, a part of the above-described exemplary embodiments may be combined with each other as needed.

In the above-described exemplary embodiments, the power control unit 260 executes the program to implement each step in FIG. 8, FIG. 9, and FIG. 10. Alternatively, the implementation of each step can be made with a hardware logic circuit.

The functions illustrated in the flowcharts in the exemplary embodiments can be implemented by executing software (program) acquired via a network or various storage media using a processing device (CPU or processor) in a personal computer (computer) or other devices.

According to the above-described exemplary embodiments, even if the power-saving button is pressed while the image forming apparatus is returning from the power-saving state, in response to the detection of an object with the sensor, unnecessary shift in the image forming apparatus to the power-saving state can be prevented.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-078434 filed Apr. 4, 2013, which is hereby incorporated by reference herein in its entirety.

What is claimed is:

1. An image forming apparatus comprising:
a detection unit configured to detect an object;
a reception unit configured to receive an operation of a user; and
a shifting unit configured to shift, if the detection unit detects an object, a power state of the image forming apparatus from a first power state to a second power state different from the first power state, and shift, if the reception unit receives an operation of a user, the power state of the image forming apparatus between the second power state and the first power state,
wherein the shifting unit, in a case where the reception unit receives the operation of a user after the detection unit detects an object and before the power state of the image forming apparatus is shifted to the second power state by the shifting unit in response to such detection, does not shift the power state of the image forming apparatus from the second power state to the first power state in response to receiving the operation of the user.

2. The image forming apparatus according to claim 1, further comprising:
a storage unit configured to store information indicating the power state of the image forming apparatus,
wherein the shifting unit, when the reception unit has received an operation of the user, if the storage unit has stored information indicating the first power state, shifts the power state of the image forming apparatus from the first power state to the second power state, and if the storage unit has stored information indicating the second power state, shifts the power state of the image forming apparatus from the second power state to the first power state.

3. The image forming apparatus according to claim 1, further comprising:
a storage unit configured to store information indicating whether to enable an interruption by the operation of the user received by the reception unit,
wherein the shifting unit, if the information stored in the storage unit indicates to disable the interruption, after the detection of the object by the detection unit, according to the operation of the user received during the shift of the image forming apparatus to the second power state, prevents the image forming apparatus from shifting from the second power state to the first power state, and if the information stored in the storage unit indicates to enable the interruption, after the detection of the object by the detection unit, according to the operation of the user received during the shift of the image forming apparatus to the second power state, allows the image forming apparatus to shift from the second power state to the first power state.

4. The image forming apparatus according to claim 1, wherein the detection unit is a sensor having a plurality of detection units.

5. The image forming apparatus according to claim 4, wherein the sensor includes an array-type sensor in which the detection units are arranged in a matrix.

6. The image forming apparatus according to claim 1, wherein the detection unit is an infrared sensor for receiving infrared light.

7. The image forming apparatus according to claim 1, wherein, in the first power state, the power consumption amount is less than the power consumption amount in the second power state.

8. The image forming apparatus according to claim 1, further comprising:
an image forming unit configured to form an image on a sheet.

9. The image forming apparatus according to claim 8, wherein, in the first power state, power supplied to the image forming unit is stopped, and in the second power state, electric power is supplied to the image forming unit.

10. A method of controlling an image forming apparatus, the method comprising:
shifting, in a case where an object is detected, a power state in the image forming apparatus from a first power state to a second power state different from the first power state;
shifting, in a case where a user operation is received, the power state in the image forming apparatus between from the second power state and to the first power state; and
performing control, in a case where the operation of a user is received after an object is detected and before the power state of the image forming apparatus is shifted to the second power state in response to such detection, the control performed such that the power state of the image forming apparatus is not shifted from the second power state to the first power state in response to receiving the operation of the user.

11. A non-transitory computer-readable storage medium storing computer executable instructions for causing a computer to perform a method, the method comprising:

shifting, in a case where an object is detected, a power state in the image forming apparatus from a first power state to a second power state different from the first power state;

shifting, in a case where a user operation is received, the power state in the image forming apparatus between from the second power state and to the first power state; and performing control, after detection of the object, during the shift of shifting, in a case where a user operation is received, the power state in the image forming apparatus between the second power state and the first power state; and performing control, in a case where the operation of a user is received after an object is detected and before the power state of the image forming apparatus is shifted to the second power state in response to such detection, the control performed such that the power state of the image forming apparatus is not shifted from the second power state to the first power state in response to receiving the operation of the user.

* * * * *